Feb. 11, 1941. H. F. VON THÜNGEN 2,231,784

PLANETARY GEAR
Filed Feb. 14, 1939

Inventor
H. F. von Thüngen
by Edmund R. Parry Jr.
Attorney

Patented Feb. 11, 1941

2,231,784

UNITED STATES PATENT OFFICE 2,231,784

PLANETARY GEAR

Hubert Freiherr von Thüngen, Friedrichshafen, Bodensee, Germany, assignor to Zahnradfabrik Friedrichshafen A.-G., Friedrichshafen, Bodensee, Germany Application February 14, 1939, Serial No. 256,371
In Germany February 15, 1938

28 Claims. (Cl. 74—306)

My invention relates to improvements in planetary gears with two or more double planet wheels of the spur wheel type.

It relates substantially to gears in which the wheel sets are provided with inclined teeth of different angles of inclination.

According to my invention the planet wheels are axially displaceable in the rotatable planet wheel carrier and between the planet wheels and their sun wheels a balancing device is provided in such a manner that there will be exerted no axial thrusts to the planet wheel bearings situated in the planet wheel carrier.

For this purpose I employ a two or three armed balancing member the ends of which are intended to take up the axial thrusts exerted to the planet wheels, the said member with its center portion resting on the sun wheel the teeth of which having the greatest angle of inclination (tooth angle), or on the axle of the said sun wheel by means of a ball or the like.

The invention includes still further features which will be mentioned further on in the specification. It has already been suggested with helicoidal wheels of different inclination of the teeth to provide a balancing lever connecting two fixed rotating shafts. But it was not known how to construct and to arrange such lever in a correct manner, especially there did not exist knowledge how for instance the whole balancing device could be designed for three or more shafts.

In contradistinction to the said known gear my planetary gear comprises improved balancing means which are rotating with the planet wheel carrier and which are accommodated in all their elements to special conditions prevailing. With my balancing device a fully automatic balance will be obtained in such a manner that at the bearings of the planet wheels no axial thrusts are exerted. This automatic balancing effect continues until all the planet wheels are sufficiently axially adjusted and an equal transmitting action of the wheels is obtained.

During operation of the balancing device the drive can take place in the one or the other direction of rotation.

Having given a general description of my invention I now want to point it out in detail referring to the drawing which represents examples embodying my invention.

Figures 1, 2, 3, 4:
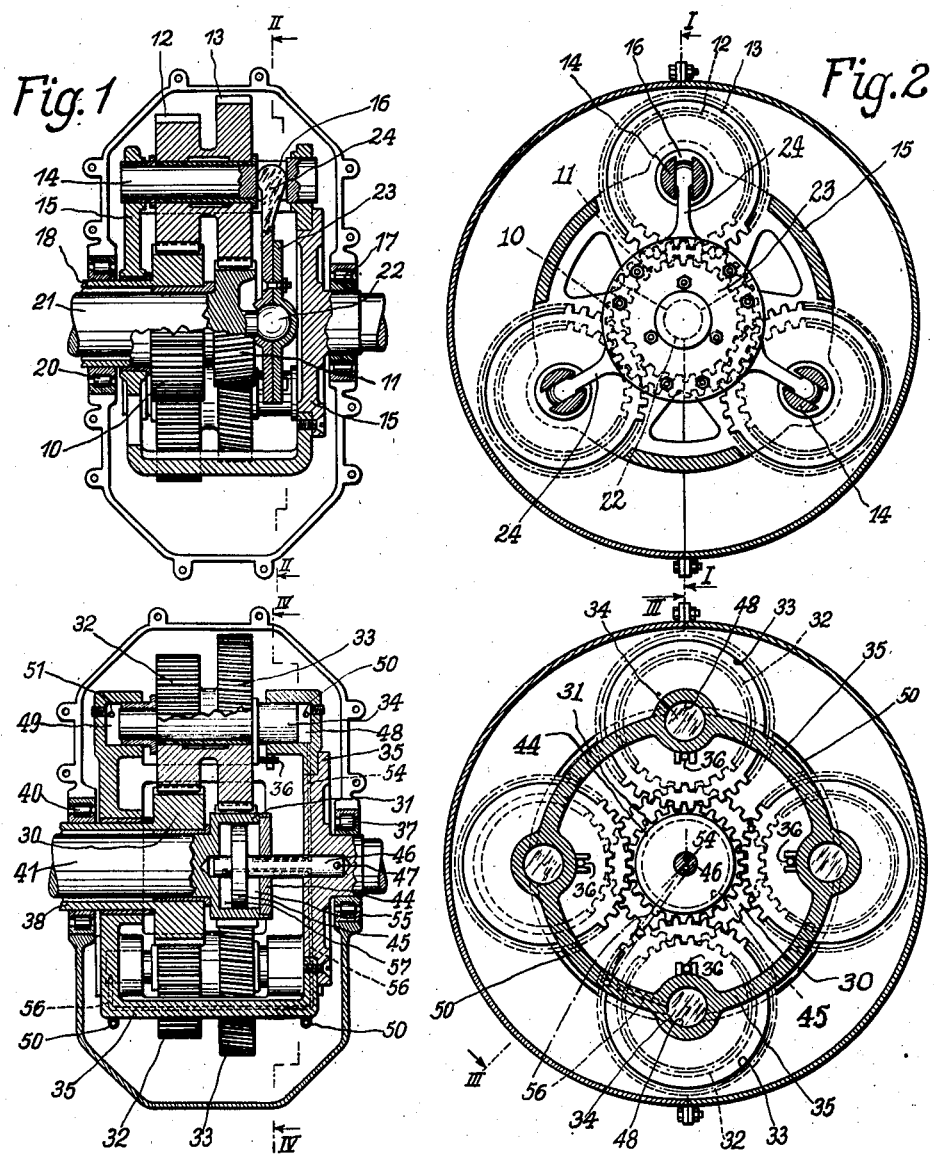
Fig. 1 shows an embodiment of a planetary gear with three double planet wheels in a sectional view taken on line I—I of Fig. 2.
Fig. 2 shows a cross section on line II—II of Fig. 1.
Fig. 3 shows in a sectional view, taken on line III—III of Fig. 4, a planetary gear with four double planet wheels in connection with a fluid pressure actuated balancing device.
Fig. 4 shows a cross section taken on line IV—IV of Fig. 3.

The planetary gear shown in Figs. 1 and 2 comprises the central wheels 10 and 11 and three double planet wheels 12 and 13 which latter are made of one piece. Here, for instance, the wheels 10 and 12 may have axially directed teeth and the wheels 11 and 13 are equipped with helical teeth. The double planet wheels 12 and 13 are loosely rotatable on their shafts 14, which are fixed in the planet wheel carrier 15. At one side the latter is rotatably mounted in the bearing 17 and at its other side on the hollow shaft 18 which carries the central wheel 10. The shaft 18 is rotatably mounted in bearing 20 in the non-rotatable housing in which also the bearing 17 is provided. The hollow shaft 18 surrounds the shaft 21, on which the central wheel 11 is fixed. The shaft 21 also carries the ball 22 on which with its middle portion 23 the three armed balancing member 24 rests. The arms 24 are projecting into slots 16 of the planet wheel shafts 14.

By means of axial displacement of the double planet wheels 12, 13 and of their shaft 14 in the planet wheel carrier 15 and in consequence of the different inclinations of the teeth there will be always correct engagement at both dentures, independent of the size of the irregularities in the pitch arising from the journalling of the wheels in the planet wheel carrier 15 and from the staggering of the teeth of the wheels 12 and 13 in relation to each other.

The balancing effect is produced by means of the three armed balancing member 23, 24 in that the three arms 24 of equal length are always taking up only the equal axial thrust whereby in turn equal tooth thrust and consequently equal transmission of power will be reached.

The embodiment as hereinbefore described may be especially adapted to the arrangement with three double planet wheels. However it may also be employable in cases in which two double planet wheels are existing.

In the embodiment according to Figs. 3 and 4 the balancing action is attained by means of fluid pressure. This kind of actuation may be especially adapted to planetary gears with more than three double planet wheels.

The general arrangement of the toothed wheels and the shafts may be of the same kind as in Figs. 1 and 2, however there may be applied four double planet wheels 32, 33, which are meshing with the central wheels 30, 31. The planet axles 34, secured against self rotation by means of pins 36 rest in the planet wheel carrier 35 adapted to rotate with its one end in the bearing 37 and with its other end on shaft 38. Fixed to the shaft 38 is the central wheel 30. The shaft 38 is rotatable in bearing 40 in the non-rotating housing which also includes the bearing 37. The shaft 38 is hollow and surrounds the shaft 41 on which the central wheel 31 is fixed. For the central wheel 31 as well as for its shaft a minimal clearance is provided to allow for axial balancing movement. If both the sets of planet wheels are provided with helical teeth, both sun wheels or one sun wheel and the planet wheel carrier are arranged axially displaceable. In the central wheel 31 a cylindrical bore closed by a cover 44 is provided and the said bore hole contains a piston 45. The piston rod 46 is fixed to the planet wheel carrier 35 by means of a pin 47. To the planet wheel carrier 35 are connected the bearing bodies for the axles 34 of the planet wheels. These bearing bodies are closed at one end so that the ends of the axles 34 form pistons in the cylindrical spaces 48, 49. All of the cylinder spaces 48 of the one gear side are connected to each other by means of tubes 50. In the same manner between the cylinder spaces 49 are provided connecting tubes 51. Said cylinder spaces of each side of the planetary gear communicate with the cylinder bore of the central wheel 31 by means of channels. One channel 54 leads from one of the cylinder spaces 48 through the vertical wall of the planet wheel carrier 35 and through bolt 46 to the cylinder space 57 at the left of piston 45. The cylinder spaces 55 and 57 and also the corresponding cylinder spaces 48 and 49, respectively, are filled with a fluid pressure medium. The acting surface of the piston 45 is equal to the sum of the acting surfaces of all the pistons formed by the planet wheel axles.

In order to always get the cylinder spaces and the tubing filled with pressure liquid and to prevent the entering of air the refillment of both the balancing systems may be performed by means of a highly situated container or by means of a pressure pump supplying a certain high pressure. In connection therewith in the connecting tubes to both sides of the planetary gear check non-return valves are to be employed.

The balancing effect is attained by the fact that in the cylinder spaces 48 and 49, respectively, always exists the same pressure as in the cylinder spaces 55 and 57, respectively, which latter are connected to the first mentioned spaces. Consequently the axial thrusts and the tooth pressure and the transmitting action of all the double planet wheels are equal. In connection with the size of the acting piston surface the axial thrust of the sun wheel by means of the helical tooth shape is equal and oppositely directed to the fluid pressure exerted on the corresponding cylinder front surface connected to the central wheel so that both these forces acting against each other rendered inactive.

By means of this arrangement it will be attained that no axial thrusts can act on the bearings of the planet wheel carrier.

As in the first described embodiment according to Figs. 1 and 2 by means of spring arrangements or by means of spring actuated balancing arms the balancing effects can be obtained as well as such effects are obtainable with the embodiment of Figs. 3 and 4 in which a gaseous pressure medium may be employed. Then displacement of the double planet wheels and the helical toothed central wheel in relation to each other will occur according to the sizes of the balancing force or the balancing pressure, respectively, which correspond the transmitted torque. Under certain circumstances the kind of attaining the balancing may be sufficient.

I claim:

1. A planetary gearing including a pair of coaxial sun gears, a plurality of pairs of coaxial planet gears meshing with the sun gears and rotatable in an orbit about the axis of the sun gears, the teeth of one gear of each planet pair being inclined to the teeth of the other gear, the pairs having an axial thrust and a member rotatable with said planet gears for equalizing the axial thrusts of the respective planet gear pairs.

2. A planetary gearing including a pair of coaxial sun gears, a plurality of pairs of coaxial planet gears meshing with the sun gears and rotatable in an orbit about the axis of the sun gears, the planet gear pairs being axially displaceable relative to the sun gears, and rotatable means through which axial movement of each pair of planet gears exerts an axial thrust on each other pair of planet gears tending to move the latter in the reverse axial direction.

3. A planetary gearing including a pair of coaxial sun gears, a plurality of pairs of coaxial planet gears meshing with the sun gears and rotatable in an orbit about the axis of the sun gears, and rotatable means through which the axial thrust of each pair of planet gears acts against each other pair of planet gears.

4. A planetary gearing including a pair of coaxial sun gears, a plurality of pairs of coaxial planet gears meshing with the sun gears and rotatable in an orbit about the axis of the sun gears, and means carried by one of the sun gears through which axial thrust of each pair of planet gears acts axially in the opposite direction against each other planet gear pair.

5. A planetary gearing including a pair of coaxial sun gears, a plurality of pairs of coaxial planet gears meshing with the sun gears and rotatable in an orbit about the axis of the sun gears, and means through which the axial thrust of each planet gear pair acts against one of the sun gears.

6. A planetary gearing including a pair of coaxial sun gears, a plurality of pairs of coaxial planet gears meshing with the sun gears and rotatable in an orbit about the axis of the sun gears, and means through which the axial thrust of each planet gear pair acts against each other planet gear pair and against one of the sun gears.

7. A planetary gearing including a pair of coaxial sun gears, a plurality of pairs of coaxial planet gears meshing with the sun gears and rotatable in an orbit about the axis of the sun gears, and means through which each pair of planet gears in moving axially in one direction exerts a thrust in the opposite direction on each other pair of planet gears and against one of the sun gears.

8. A planetary gearing including a pair of coaxial sun gears, a plurality of pairs of coaxial planet gears meshing with the sun gears and rotatable in an orbit about the axis of the sun gears, and means carried by one of the sun gears for axially adjusting each planet gear pair to positions in which corresponding planet gears of the respective pairs bear the same tooth load.

9. A planetary gearing including a pair of coaxial sun gears, a plurality of pairs of coaxial planet gears meshing with the sun gears and rotatable in an orbit about the axis of the sun gears, and means rotatably mounted axially of the sun gears through which axial movement of each planet gear pair is opposed by the axial thrust of each other planet gear pair.

10. A planetary gearing including a pair of coaxial sun gears, a plurality of pairs of coaxial planet gears meshing with the sun gears and rotatable in an orbit about the axis of the sun gears, and means carried by one of the sun gears for neutralizing the end thrusts of the respective planet gear pairs.

11. A planetary gearing including a pair of coaxial sun gears, a plurality of pairs of coaxial planet gears meshing with the sun gears and rotatable in an orbit about the axis of the sun gears, and thrust responsive means through which axial movement of each pair of planet gears produces opposite axial movement of one or more of the other planet gear pairs until the respective planet gear pairs reach positions in which corresponding gears bear an equal tooth load, said thrust responsive means including means operative to cause the axial thrust of each planet gear pair to act in opposite axial direction against one of the sun gears.

12. A planetary gearing including a pair of coaxial sun gears, a plurality of pairs of coaxial planet gears meshing with the sun gears and rotatable in an orbit about the axis of the sun gears, and means providing for axial adjustment of the respective planet gear pairs through which axial thrust of the planet gear pairs is taken up by one of the sun gears.

13. A planetary gearing including a pair of coaxial sun gears, three or more pairs of coaxial planet gears meshing with the sun gears and rotatable in an orbit about the axis of the sun gears, and means opposing the end thrust of each planet gear pair universally fulcrumed axially of one of the sun gears.

14. A planetary gearing including a pair of coaxial sun gears, a plurality of pairs of coaxial planet gears meshing with the sun gears and rotatable in an orbit about the axis of the sun gears, and rotatable means mounted axially of one of the sun gears for rocking movement through which axial movement of each pair of planet gears in one direction results in a thrust against each other pair of planet gears tending to move each said other pair of planet gears in the opposite direction.

15. A planetary gearing including a pair of coaxial sun gears, a plurality of pairs of coaxial planet gears meshing with the sun gears and rotatable in an orbit about the axis of the sun gears, and fluid pressure means opposing axial thrust of each of the planet gear pairs.

16. A planetary gearing including a pair of coaxial sun gears, a plurality of pairs of coaxial planet gears meshing with the sun gears and rotatable in an orbit about the axis of the sun gears, and fluid pressure means for absorbing axial thrust of each planet gear pair and providing for axial adjustment of each said gear pair.

17. A planetary gearing including a pair of coaxial sun gears, a plurality of pairs of coaxial planet gears meshing with the sun gears and rotatable in an orbit about the axis of the sun gears, and fluid pressure means through which axial movement of each planet gear pair produces a thrust on one of the sun gears.

18. A planetary gearing including a pair of coaxial sun gears, a plurality of pairs of coaxial planet gears meshing with the sun gears and rotatable in an orbit about the axis of the sun gears, and fluid pressure means through which axial movement of each planet gear pair produces a thrust on one of the sun gears and against each other pair of planet gears.

19. A planetary gearing including a pair of coaxial sun gears, a rotary planet gear carrier, a plurality of pairs of coaxial planet gears mounted for axial adjustment in said rotary carrier and meshing with the sun gears, at least one of the sun gears and the planet gears meshing therewith having helicoidal gear teeth, and means interconnecting each planet gear pair with one of the sun gears and preventing bearing thrust of the planet gears axially against the rotary carrier.

20. A planetary gearing including a pair of coaxial sun gears, a rotary planet gear carrier, a plurality of pairs of coaxial planet gears mounted for axial adjustment in said rotary carrier and meshing with the sun gears, one sun gear and its meshing planet gears having gear teeth inclined to the teeth of the second sun gear and the planet gears meshing with the latter, and means interconnecting each planet gear pair with one of the sun gears and preventing bearing thrust of each planet gear pair against the rotary carrier.

21. A planetary gearing including a pair of coaxial sun gears, a rotary planet gear carrier, a plurality of pairs of coaxial planet gears mounted for axial adjustment in said rotary carrier and meshing with the sun gears, one sun gear and its meshing planet gears having teeth pitched at zero angle or more, the other sun gear and its meshing planet gears having teeth pitched at a greater angle, and means through which axial thrust of each planet gear pair is taken up by the sun gear of greater tooth pitch.

22. A planetary gearing including a pair of coaxial sun gears, a rotary planet gear carrier, a plurality of shafts journaled in said rotary carrier for axial adjustment, a pair of planet gears on each of said shafts meshing with the sun gears, a thrust receiving member mounted axially of one of the sun gears for tilting movement relative thereto and pivotally connected to each of the planet gear shafts.

23. A planetary gearing including a pair of coaxial sun gears, a rotary planet gear carrier, a plurality of shafts journaled in said rotary carrier for axial adjustment, a pair of planet gears on each of said shafts meshing with the sun gears, and thrust absorbing means for the planet gear shafts including a fluid pressure cylinder and piston at the opposite ends of each planet gear shaft, a central fluid pressure piston and cylinder mounted axially of one of the sun gears, and fluid pressure lines interconnecting the cylinders at the opposite ends of the planet shafts with central cylinder at opposite sides of the central piston.

24. A planetary gearing as in claim 23, wherein the central cylinder has an area equal to the sum of the areas of the cylinders at the end of each planet gear shaft.

25. In a planetary gearing, a sun gear, a helicoidal planet gear having an axial thrust under working conditions, and fluid pressure means through which the axial thrust of the helicoidal planet gear is applied to the sun gear.

26. In a planetary gearing, a helicoidal sun gear, a rotatable carrier, a helicoidal planetary gear rotatably mounted in said carrier and meshing with said sun gear, said helicoidal planetary gear having an axial thrust, and means for receiving the axial thrust of said planetary gear mounted independently of the rotatable carrier and preventing application of said thrust to the carrier.

27. In a planetary gearing, a sun gear, a plurality of helicoidal planet gears having axial thrusts under working conditions, and means through which the axial thrust of each planet gear acts against each other planet gears and against the sun gear.

28. In a planetary gearing a helicoidal planet gear having an axial thrust under working conditions, a sun gear, and means through which the axial thrust of the helicoidal planet gear acts against the sun gear.

HUBERT FREIHERR von THÜNGEN.